United States Patent [19]
Hannaford et al.

[11] Patent Number: 5,642,469
[45] Date of Patent: Jun. 24, 1997

[54] DIRECT-DRIVE MANIPULATOR FOR PEN-BASED FORCE DISPLAY

[75] Inventors: Blake Hannaford; Pietro Buttolo, both of Seattle, Wash.

[73] Assignee: University of Washington, Seattle, Wash.

[21] Appl. No.: 334,621

[22] Filed: Nov. 3, 1994

[51] Int. Cl.$^6$ .............................. G06F 15/00; G06F 3/033
[52] U.S. Cl. ............................................. 395/99; 345/179
[58] Field of Search ...................... 345/156, 179; 901/15, 23, 24, 40, 47; 403/91, 163; 414/4, 36; 395/80, 99

[56] References Cited

U.S. PATENT DOCUMENTS

| | | |
|---|---|---|
| 4,795,296 | 1/1989 | Jan. |
| 5,004,391 | 4/1991 | Burdea. |
| 5,072,361 | 12/1991 | Davis et al.. |
| 5,143,505 | 9/1992 | Burdea et al.. |
| 5,201,838 | 4/1993 | Roudaut. |
| 5,231,693 | 7/1993 | Backes et al. ............ 395/99 |
| 5,266,875 | 11/1993 | Slotine et al. ............ 395/99 X |
| 5,267,956 | 12/1993 | Beuchat. |
| 5,382,885 | 1/1995 | Salcudean et al. ............ 395/99 X |
| 5,410,638 | 4/1995 | Colgate et al. ............ 395/99 |
| 5,524,180 | 6/1996 | Wang et al. ............ 395/99 X |

OTHER PUBLICATIONS

Millman et al., "Design of a Four Degree-of-freedom Force-Reflecting Manipulandum with a Specified Force/Torque Workspace" Proceedings of 1991 IEEE INt'l Conf on Robotics & Auto, Apr. 1991.

Ramstein et al., "The Pantograph: A Large Workspace Haptic Device for a Multimodal Human-Computer Interaction,".

"The Phantom Force-Reflecting Interface," Sensable Devices, Inc.

Iwata, "Pen-based Haptic Virtual Environment," IEEE publication No. 0-7803-1363; Jan. 1993.

Wong et al., "A Force-Reflecting Teleoperation System with Magnetically Levitated Master and Wrist," Proceedings of 1992 IEEE Int'l Conf. on Robotics and Automation; France May 1992.

Bostrom et al., "Design of an Interactive Lumbar Puncture Simulator with Tactile Feedback," IEEE Pub #0-7803-1363; Jan. 1993.

Hirota et al., "Development of Surface Display," IEEE Pub. No. 0-7803-1363; Jan. 1993.

*Primary Examiner*—Mark R. Powell
*Attorney, Agent, or Firm*—Steven P. Koda

[57] ABSTRACT

A pen-based direct-drive manipulator enables precision manipulation and force display of a control point within three degrees of freedom. The control point exhibits substantially no backlash, very low friction and very low inertia making it useful as a force display. The manipulator also has a very high force generation bandwidth allowing high frequency force components to be displayed. A parallel actuator structure controls motion over two degrees of freedom in a horizontal plane. The parallel structure is a redundant structure including three chains in parallel coupled at the control point. The redundant structure provides a uniform force capability throughout the manipulator workspace. A pair of rotational actuators rotate the parallel structure about an axis to approximate a linear motion along a third axis. The rotational actuators provide a third degree of freedom for the control point. Motion about the third axis is substantially decouple from motion about the horizontal plane.

14 Claims, 3 Drawing Sheets

DIRECT-DRIVE MANIPULATOR FOR PEN-BASED FORCE DISPLAY

FEDERAL FUNDING AGREEMENT

This invention was made with government support under grant number BCS 9058408 awarded by the National Science Foundation. The government has certain rights in the invention.

BACKGROUND OF THE INVENTION

This invention relates to direct-drive manipulators and force feedback devices. More particularly this invention relates to a direct-drive manipulator having three degrees of freedom and suitable for use as a pen-based force display for a virtual reality or telerobotic environment.

A manipulator can serve as an input device for controlling movement of a robot or other real or simulated device. A direct drive manipulator responds to operator manipulations using one or more actuators directly coupled to a load (on the output side) or an operator contact point (on the input side). This contrasts with an indirectly driven manipulator which responds to operator manipulations using one or more actuators indirectly coupled to the load or operator contact point through gears or other scaling devices.

A pen-based manipulator is characterized by an elongated member having a contact point for applying operator input forces and displacements. The manipulator enables an operator holding the elongated member to move the member within a workspace under the control of manipulator components (e.g., actuators, joints and links).

A force feedback device is characterized as an output device in which forces are applied to an operator holding the feedback device. In several telerobotic applications, for example, a master manipulator located away from a robot controls a slave manipulator located at the robot. The master manipulator serves as an input device for commanding movement of the robot via forces or displacements applied to the manipulator by an operator. In addition, the master manipulator sometimes serves as a force feedback device for exhibiting force sensations felt by the operator. In a force reflection application, for example, the forces encountered by the robot under control are reflected back to the operator at the manipulator to enable improved coordination of robot motion and dexterity. U.S. Pat. No. 5,072,361 (Davis et al.) discloses a force-reflective tele-operation control system in which a master station includes an actuator exhibiting force resistance to movement in a master link. Such resistance is to be comparable to the resistance encountered by a slave device so that movement of the master device by an operator tracks movement of the slave device being controlled.

A force feedback device also is referred to as a force display. In the computer field the term display refers to a visual output device upon which ephemeral images are shown. The display serves as a visual interface between an end user and a computer environment. An operator uses his visual sense to experience the images. Analogously, the term "force display" is coined to refer to an output device upon which ephemeral forces are exhibited. The force display serves as a force-reflective, haptic, kinaesthetic, or tactile interface between an operator and a real or simulated environment. The operator uses his sense of touch to experience the forces. The force display, however, typically is more than a display in that it also serves as an input device. A force display is a bidirectional mechanical interface through which an operator both applies and receives forces and displacements.

SUMMARY OF THE INVENTION

According to the invention, a direct-drive manipulator enables precision manipulation and force display at a control point. By using a pen-like or other end-effector an operator applies forces to the control point. The manipulator responds to the applied forces allowing movement of the control point within a workspace domain over three degrees of freedom. When combined with a controller implementing a control algorithm for a specific application environment, force sensations are reflected back to the control point to be experienced by the operator. Virtual reality, telerobotic, and other simulated, real or remote applications can be created to define a control algorithm. For example, a control algorithm may define immovable object shapes. An operator then is able to trace the virtual object shapes and feel the object boundaries. In another example, a control algorithm may define tissue having shape, texture and force resistance variables at different locations. An operator then may perform a virtual reality surgery, in which the control point is the cutting point of a scalpel. Depending on the position of the control point and force applied, the operator experiences the sensation of cutting through the virtual tissue. In a telerobotic application for remotely controlling a robot, the control algorithm is defined as a reflection of forces encountered by the robot. There are many other examples of a control algorithm that could be created to use with the manipulator. This invention is directed toward the manipulator with control point to be used as a force display.

To serve as a force display it is desirable that the manipulator have substantially no backlash, very low friction, and very low inertia. Backlash, friction and inertia detract from a natural feel of a control point. No matter how sophisticated a control algorithm, if the manipulator suffers from significant amounts of backlash, friction or inertia, then its use as a force display is compromised. It also is desirable that the manipulator have a high bandwidth so that high frequency force components can be displayed.

According to one aspect of the invention, direct drive actuators are used for the manipulator. Direct drive actuators have force display advantages over indirect drive actuators. Indirect drive geared actuators have unacceptable backlash and friction characteristics. Also, indirect drive actuators typically have lower bandwidth capability. Direct drive actuators are implemented here in a configuration for a control point having no backlash, very low friction and very high force generation bandwidth.

According to another aspect of the invention, a parallel actuator structure is used to control motion in a horizontal plane to achieve very low inertia of the control point. The parallel structure provides two degrees of freedom in a horizontal plane of motion.

According to another aspect of the invention, the parallel structure is a redundant structure including three chains in parallel coupled at the control point. Each chain includes an actuator and two links. Each actuator is positioned at a fixed origin. One end of an inner link is coupled to the actuator. An opposite end of the inner link is coupled to one end of an outer link. A joint is formed at the connection of the inner and outer links. The opposite end of the outer link is coupled to the control point. The three chains define a planar structure in which three actuators provide two degrees of freedom with redundancy.

The parallel redundant (3-chain) structure of this invention improves over prior parallel 2-chain structures by enabling a more uniform force capability throughout the manipulator workspace. In the workspace of a conventional 2-chain structure the maximum force that can be applied to a control point varies depending on where the control point currently is positioned. According to the 3-chain structure of this invention, however, the maximum force that can be applied is substantially uniform throughout the workspace.

According to another aspect of the invention redundant sensing also is performed by including a sensor at each actuator in the parallel structure. Redundant sensing enables more uniform high resolution position sensing throughout the workspace.

According to another aspect of the invention the end-effector defines an open tool interface point as the control point. An operator holds his finger, a pen-like tool or other tool to the interface point and applies forces or displacements to manipulate the control point. By providing an open interface there is no friction or backlash introduces by a device that would hold the tool tip in place at the control point. Similarly the operator can apply or remove the tool from the control point with a natural feel. For example if the tool is a scalpel in a surgical virtual reality application, the trainee physician can manipulate the scalpel as during a real operation, then apply the scalpel to the control point to perform a cutting/surgical maneuver. The operator therefore achieves a more realistic making and breaking of contact.

According to another aspect of the invention, a pair of rotational actuators rotate the parallel structure about an axis to approximate a linear motion along a third axis, and provide a third degree of freedom for the control point.

One advantage of the manipulator of this invention is that embodiments have substantially no backlash, very low friction, very low inertia and a very high force generation bandwidth enabling a natural feel when implemented as a force display. Another advantage is that embodiments have a substantially uniform force capability throughout there workspace. These and other aspects and advantages of the invention will be better understood by reference to the following detailed description taken in conjunction with the accompanying drawings.

DESCRIPTION OF SPECIFIC EMBODIMENTS

Overview

Figure 1:
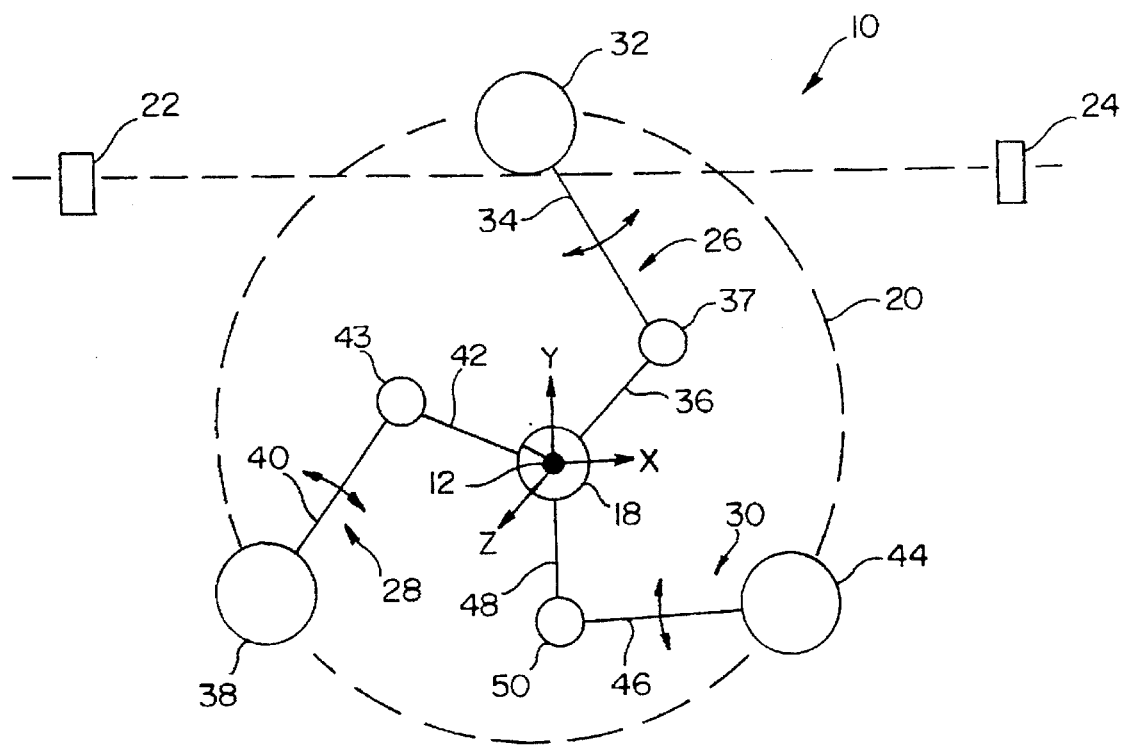
FIG. 1 is a schematic diagram of the pen-based direct-drive manipulator according to an embodiment of this invention.
Figure 2:
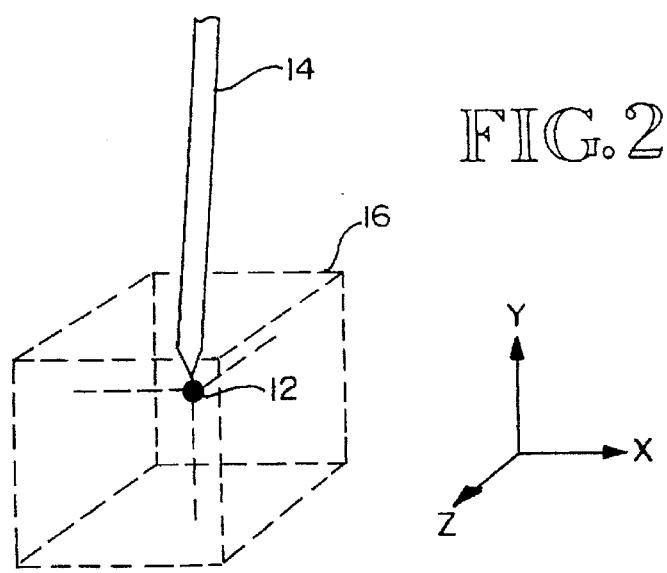
FIG. 2 is a diagram of the control point and workspace for the manipulator of FIG. 1 with a pen-like tool used by an operator.

FIG. 1 shows a schematic diagram of the pen-based direct-drive manipulator 10 according to one embodiment of the invention. The function of the manipulator 10 is to enable precision manipulation and force display at a control point 12. Referring to FIG. 2, an operator uses a pen-like or other tool 14 to apply forces/displacements to the control point 12. The manipulator 10 responds to the applied forces allowing control point 12 movement with three degrees of freedom within a workspace 16. The control point 12 is defined at an end-effector 18. The manipulator 10 includes a planar structure 20 enabling motion in an xy plane to define two degrees of freedom. The planar structure 20 is moved along a z-axis by actuators 22, 24 to define a third degree of freedom.

Figure 3:
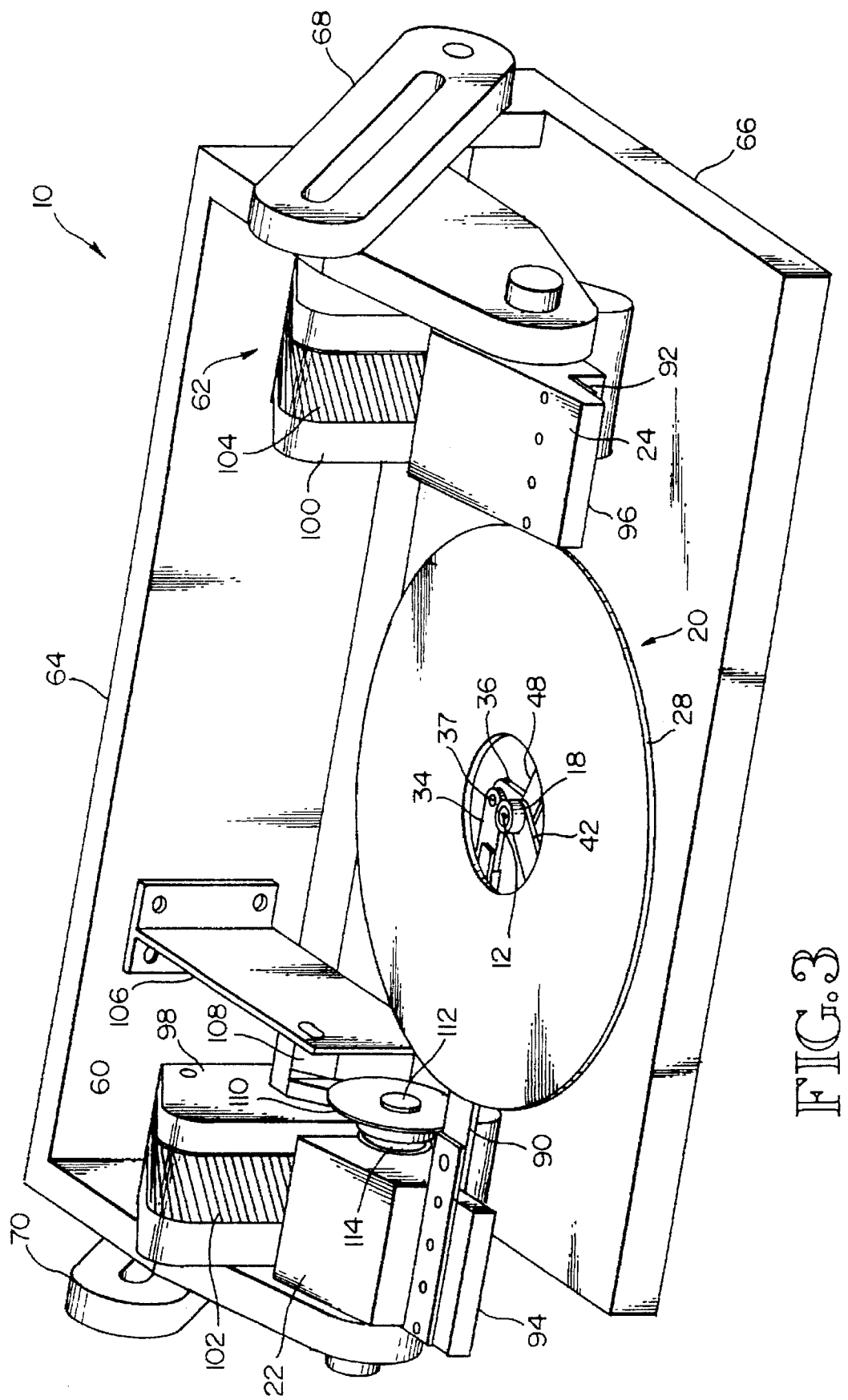
FIG. 3 is a perspective view of the pen-based direct-drive manipulator according to an embodiment of this invention.

FIG. 3 shows an assembled direct-drive manipulator 10 according to an embodiment of this invention. The manipulator includes a planar assembly 20 mounted to rotational actuation assemblies 60, 62. The rotational actuation assemblies 60, 62 are mounted to a yoke plate 64. The yoke plate is adjustably mounted to a base plate 66 via links 68, 70. The base plate 66 rests on a surface. The yoke plate 64 is adjustable relative to the base plate 66 to provide a desirable position and orientation to the planar assembly 20. For a given application an operator may prefer the xy plane to a have a specific position and orientation relative to the operator's tool 14. By adjusting the yoke plate relative to the base 66 a desired orientation is achieved. In an alternative embodiment, the rotational actuation assemblies 60, 62 are replaced with vertical actuation assemblies. As implemented in the embodiment shown, the rotational assemblies generate motion approximating vertical motion along the z-axis of workspace 16.

Planar Actuation Structure

Figure 4:
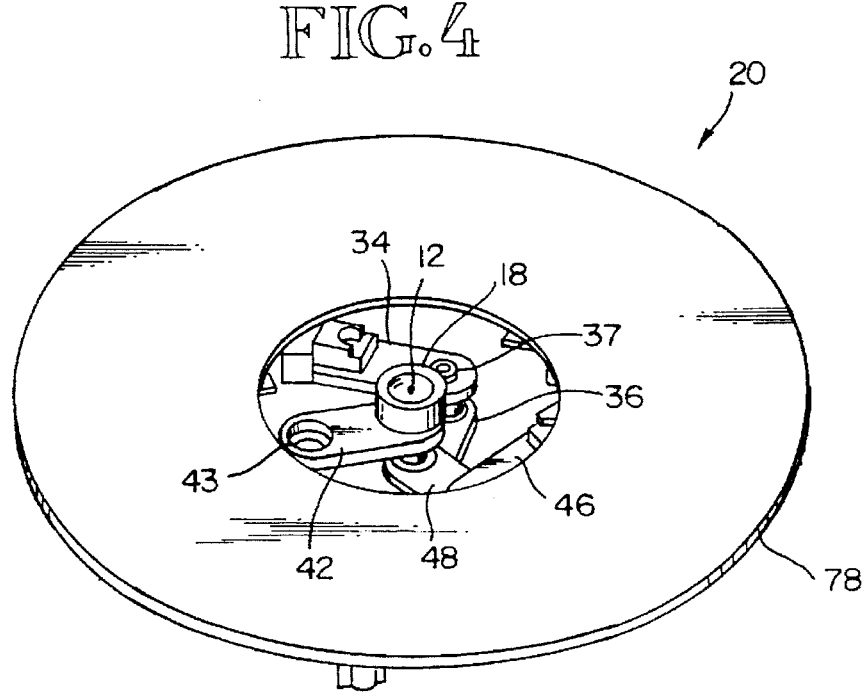
FIG. 4 is a perspective view of the planar assembly portion of the manipulator of FIG. 1 which defines two degrees of freedom.
Figure 5:
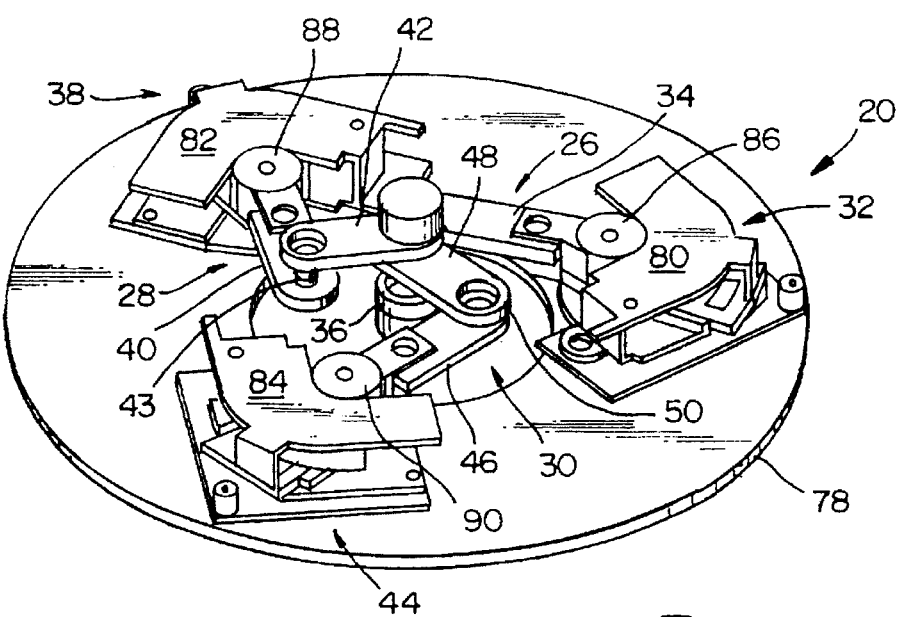
FIG. 5 is another perspective view of the planar assembly portion of the manipulator of FIG. 1 which defines two degrees of freedom.

Referring to FIGS. 1, 4 and 5, the planar structure 20 is a parallel, redundant actuator assembly, including three chains 26, 28, 30 in parallel coupled at an end effector 18. Each chain includes an actuator and two links. A first chain 26 includes an actuator 32, inner link 34 and outer link 36. A joint 37 is formed between the inner link 34 and outer link 36. A second chain 28 includes an actuator 38, inner link 40 and outer link 42. A joint 43 is formed between the inner link 40 and outer link 42. A third chain 30 includes an actuator 44, inner link 46 and outer link 48. A joint 50 is formed between the inner link 46 and outer link 48. Low friction ball bearings, washers and rigid connecting axes are included at joints 37, 43 and 50 and where outer links 36, 42, 48 couple to the end effector 18. Each actuator 32, 38, 44 is fixed relative to the planar structure 20, and thus, relative to the xy plane.

Referring to FIGS. 4 and 5 the chains 26, 28, 30 are mounted to a rigid disk 78 having a planar surface. In one embodiment the disk 78 is the media disk of a 3.5 inch hard disk drive. The inner links 34, 40, 46 and outer links 36, 42, 48 are machined from 3.5 inch hard disk drive media. Also, each actuator 32, 38, 44 is a direct drive actuator like those used in computer hard disk drives, such as a 1.8 inch hard disk drive. Each actuator 32, 38, 44 structure is implemented as a direct drive actuator and includes a flat coil, magnet, encoder, encoder base, codewheel, codewheel screw and codewheel base. Encoder bases 86, 88, 90 are shown. In an alternative embodiment, the planar structure 20 includes redundant actuators (e.g., 3), but not redundant encoders, (e.g., only two are used). In one embodiment the codewheels are Hewlett Packard codewheel part no. HEDM-5120-J03 and the encoders are Hewlett Packard encoder module part no. HEDS-9100-J00. The magnets and flat coils are from a 1.8 inch hard disk drive and the magnet frames 80, 82, 84 are machined from a 1.8 inch hard disk drive frame. Although 3.5 inch and 1.8 inch hard disk drive scaling is used on the described embodiment, the components may be scaled to larger or smaller dimension to increase or decrease the workspace 16 (see FIG. 2). In addition other types of actuators may be used. Preferably the actuators have low friction, low inertia and substantially no backlash.

Rotational Actuation Structure

Referring again to FIG. 3 the rotational actuation structures 60, 62 are shown. The planar structure 20 is coupled to the rotational actuation structures 60, 62 at fixed links 90, 92. The links 90, 92 are mounted to respect rotational actuator frames 94, 96. In one embodiment the frames 94, 96 are moved by 5.25 inch hard disk drive flat coil and magnet assemblies which serve as actuators 22, 24. Magnets 98, 100 and flat coils 102, 104 are shown. An encoder module is formed by encoder module base 106, encoder 108, codewheel 110, codewheel screw 112, codewheel base 114 and washers. In one embodiment the codewheel is a Hewlett Packard codewheel part no. HEDM-5120-J03 and the encoder is a Hewlett Packard encoder module HEDS-9100-J00. Although 5.25 inch hard disk drive scaling is used on the described embodiment, the components may be scaled to larger or smaller dimension to increase or decrease the workspace 16 (see FIG. 2). In the described embodiment, the rotational actuation structures 60, 62 define motion approximating vertical motion along the z axis of the workspace domain. If the vertical dimension of the workspace is desired to be increased outside the range of the vertical approximation, then the motion in the z direction is coupled to the motion in the x and y directions. In the preferred embodiment such motions are substantially decoupled.

Kinematic Characteristics

The manipulator 10 enables movement of a control point 12 within a workspace 16 over three degrees of freedom. Two degrees of freedom are provided by the planar actuation structure 20 allowing motion within an xy plane. A third degree of freedom is provided by the rotational actuation structures 60, 62 allowing motion along a z-axis. The workspace of the described embodiment is approximately 2 cm×2 cm×2 cm. For the rotational actuators 20, 22 this represents approximately ±20°. Over such rotation, the rotary motion is approximated as linear motion along the z-axis. By approximating the motion as linear, the planar xy motion and the vertical z motion are substantially decoupled allowing for simpler kinematic modelling and simpler control algorithms.

In the following static and dynamic equations of the manipulator 10, the following notations are used:

$^i\Theta_1$ = angle of inner link in i-th serial chain $^i\Theta_2$ = angle of outer link in i-th serial chain $^i\Theta_{12} = {^i\Theta_1} + {^i\Theta_2}$ $^ix_o, {^iy_o}$ = position of origin of i-th serial chain in xy plane $^ix_{in}, {^iy_{in}}$ = position of intermediate joint in i-th serial chain in xy plane $x_e, y_e$ = position of end effector in xy plane $z_e$ = vertical position of end effector Also, in one embodiment, the following manipulator parameters are implemented:

$l_1$ = length of inner link for each serial chain = 2 cm $l_2$ = length of outer link for each serial chain = 1.25 cm l = length between the origins of a first and a second actuator in the planar actuating structure = 4.05 cm $l_z$ = displacement of end effetor from the z-axis = 2 cm Position of end effector:

Because the motions in the xy plane are substantially decoupled from the motion along the z-axis, $x_e, y_e$ is independent of $z_e$. The end effector position in the xy plane is:

$$\begin{bmatrix} x_e \\ y_e \end{bmatrix} = R \begin{bmatrix} dtxdir \\ dtydir \end{bmatrix} + \begin{bmatrix} {^1x_{in}} \\ {^1y_{in}} \end{bmatrix}$$

where, R = frame rotation and more specifically $$R = \begin{bmatrix} (^2x_{in} - {^1x_{in}}) & (^2y_{in} - {^1y_{in}}) \\ (^2y_{in} - {^1y_{in}}) & -(^2x_{in} - {^1x_{in}}) \end{bmatrix} / lendir$$

$dtxdir = lendir/2$ $dtydir = \pm\sqrt{l_2^2 - dtxdir^2}$ $lendir = \sqrt{(^2x_{in} - {^1x_{in}})^2 + (^2y_{in} - {^1y_{in}})^2}$ The end effector position along the z-axis is:

$z_e = l_z \sin \Theta_z \approx l_z \Theta_z$

The position of the intermediate joints formed by the inner and outer links of a respective serial chain are:

$(^1x_{in}, {^1y_{in}}) = (-l_1 \cos({^1\Theta_1}), -l_1 \sin({^1\Theta_1})) + ({^1x_o}, {^1y_o})$ $(^2x_{in}, {^2y_{in}}) = (-l_1 \cos({^2\Theta_1}), -l_1 \sin({^2\Theta_1})) + ({^2x_o}, {^2y_o})$ $(^3x_{in}, {^3y_{in}}) = (-l_1 \cos({^3\Theta_1}), -l_1 \sin({^3\Theta_1})) + ({^3x_o}, {^3y_o})$ The joint angles, $^i\Theta_1$, are defined as:

$^i\Theta_1 = a\tan[({^iy_{in}} - {^iy_o})/({^ix_{in}} - {^ix_o})]$ for $^ix_{in} - {^ix_o} \geq 0$;

and $^i\Theta_1 = a\tan[({^iy_{in}} - {^iy_o})/({^ix_{in}} - {^ix_o})] + \pi$ for $^ix_{in} - {^ix_o} < 0$ The actuated link displacement and overall actuator displacements in the xy plane are given as:

$$\dot{^i\Theta_1} = \begin{bmatrix} \cos{^i\Theta_{12}} & \sin{^i\Theta_{12}} \\ l_1\sin{^i\Theta_2} & l_1\sin{^i\Theta_2} \end{bmatrix} \dot{x_e}$$

and $$\vec{\Theta} = \begin{bmatrix} ^1\dot\Theta_1 \\ ^2\dot\Theta_1 \\ ^3\dot\Theta_1 \end{bmatrix} = J_e^{-1}(\vec\Theta) \dot{x_e}$$

The force exerted on the end effector in the xy plane as a function of actuator displacements and torques is given as:

$$\vec{F_e} = J_e^T(\vec\Theta) \begin{bmatrix} \tau_1 \\ \tau_2 \\ \tau_3 \end{bmatrix}$$

The torque vector for the third degree of freedom is given as:

$\tau_z = l_z(mg + F_z)$

Dynamic Equations

At the end effector alone with no outside force applied, the equation of the i-th serial chain is:

$^i\tau = {^iM}(\vec\Theta) {^i\ddot\Theta} + {^iV}(\vec\Theta, \vec{\dot\Theta}) + {^iG}(\vec\Theta)$ and in the cartesian frame is:

$^iF_e = {^iM_e}(\vec\Theta)\ddot{x_e} + {^iV_e}(\vec\Theta, \vec{\dot\Theta}) + {^iG_e}(\vec\Theta)$ Assuming the gravity force to be zero because the planar actuation structure works in the horizontal plane, the interaction forces between the chains are given as:

$$^1\vec{F}_e + {}^1M_e({}^1\vec{\Theta})\ddot{x}_e = {}^1V_e({}^1\vec{\Theta},{}^1\dot{\vec{\Theta}}) + \vec{F}_{21} + \vec{F}_{31}$$

$$^2\vec{F}_e + {}^2M_e({}^2\vec{\Theta})\ddot{x}_e = {}^2V_e({}^2\vec{\Theta},{}^2\dot{\vec{\Theta}}) + \vec{F}_{12} + \vec{F}_{32}$$

$$^3\vec{F}_e + {}^3M_e({}^3\vec{\Theta})\ddot{x}_e = {}^3V_e({}^3\vec{\Theta},{}^3\dot{\vec{\Theta}}) + \vec{F}_{13} + \vec{F}_{23}$$

where $F_{ij}$ is the force exerted by the i-th serial chain on the j-th serial chain. Because the force are endogenous, they sum to zero:

$$F_{21} + F_{31} + F_{12} + F_{32} + F_{13} + F_{23} = 0$$

Adding together the three dynamic equations and considering an external force $F_{ext}$, we get the dynamic equations of the 2-dof planar actuating structure in the cartesian frame of reference:

$$\Sigma^i\vec{F}_e + \vec{F}_{ext} = \Sigma M_e(\Theta)\ddot{x}_e + \Sigma V_e(\vec{\Theta},\dot{\vec{\Theta}})$$

The equation for the third degree of freedom is approximately:

$$\tau_z = l_z mg + l_z F_z + l_z \dot{\omega}_z$$

where $\omega_z$ is the angular rotation of the $\Theta_z$ joint.

Actuation Redundancy

Because there are three actuators 32, 38, 44 providing two degrees of freedom, there are an infinite number of possible torque vectors that provide the same force. One approach is to select the torque vector that minimizes the energy spent by the serial chains 26, 28, 30. A preferable approach is to choose the torque vector that maximizes the force that can be applied at the control point 12 (subject to actuator limits). Accordingly, the serial chains are controlled to move in response to external forces at the control point 12 in a manner that minimizes the following:

$$\max\ (|\tau_1|, |\tau_2|, |\tau_3|)$$

where $\tau_i$ is the torque magnitude of the i-th actuator in the planar structure 20.

In one embodiment a given controller implements a simplex algorithm to identify max $(|\tau_1|,|\tau_2|,|\tau_3|)$. Inputs are the end effector position $x_e$ and the desired force $F_e$. The following steps then are performed:

Step 1: Calculate $J^{-T}_e(x_e(t_o))$;

Step 2: Calculate $\beta_1, \beta_2, \beta_3$, where $$\beta_1 = (J^{-T}_{e11}F_{ey} - J^{-T}_{e21}F_{ex})$$

$$\beta_2 = (J^{-T}_{e12}F_{ey} - J^{-T}_{e22}F_{ex})$$

$$\beta_3 = (J^{-T}_{e13}F_{ey} - J^{-T}_{e23}F_{ex})$$

Step 3: Set i3=1, i1=2, i2=3;

Step 4: Calculate $\gamma_{i1}, \gamma_{i2}$, where $$\gamma_{i1} = J^{-T}_{e(1,i1)} - J^{-T}_{e(1,i3)} \cdot (\beta_{i1}/\beta_{i3})$$

$$\gamma_{i2} = J^{-T}_{e(1,i2)} - J^{-T}_{e(1,i3)} \cdot (\beta_{i2}/\beta_{i3})$$

Step 5: Set $\tau_{i1} = \text{sign}(Y_{i1}) \cdot \tau_{sat}, \text{sign}(Y_{i2}) \cdot \tau_{sat}$;

Step 6: Calculate $\tau_{i3}$; and $$\tau_{i3} = (\beta_{i1}/\beta_{i3})\tau_{i1} + (\beta_{i2}/\beta_{i3})\tau_{i2}$$

Step 7: If $|\tau_{i3}| \geq \tau_{sat}$, permute i3=i2, i2=i1,i1=i3 and start again from step 4.

The output solution is $\tau_{i1}, \tau_{i2}, \tau_{i3}$.

Experimental Results

In one embodiment, a manipulator 10 includes actuation structures machined in part from computer hard disk drive actuators. Characteristically these actuators have low inertia and low friction. Using 1.8" actuators for the planar actuation structure 20 and 5.25" actuators for the rotational actuating structures 60, 62, the following parameters were measured:

Steady state current at 120° C.: 1.8" actuators=0.65 A 5.25" actuators=0.52 A

Continuous torque that can be generated: 1.8" act=0.01 Nm 5.25" act.=0.06 Nm

Short term peak torque: for 1.8"=0.03 Nm (at 2 A) for 5.25"=0.24 Nm (at 2 A)

Serial chain parameters:
$l_1$=2 cm
$l_2$=1.25 cm
$l$=4.05 cm
$l_z$=2 cm

The mass of each inner link 34, 40, 46 is approximately m=1.0 grams. The mass of each outer link 36, 42, 48 is approximately 0.5 grams. The mass of the end effector is less than one gram. The moment of inertia of the inner links 34, 40, 46 about the axis passing through the center of mass and parallel to the z-axis is $I_1$=0.083 gr-cm². The moment of inertia of the outer links 36, 42, 48 about the axis passing through the center of mass and parallel to the z-axis is $I_1$=0.016 gr-cm². The total mass of the planar actuating structure 20 is approximately 150 grams.

Peak force applied by end effector in upward direction is 13.50N.

Maximum continuous force applied by end effector in upward direction is 4.5N.

Peak force applied by end effector in xy plane is 1.5N.

Maximum continuous force applied by end effector in xy plane is approximately 0.55N and substantially uniform throughout the workspace.

The practical range of maximum force applied in xy plane is 0.5–1.5N using a simplex algorithm.

In one embodiment the simplex algorithm is executed at 10 kHz as part of a controller written in assembly and C language on a 486DX 66 MHz general purpose microcomputer.

These values are for an end effector workspace of approximately 1.5 cm³.

Operation—Manipulation and Force Display

The manipulator 10 implemented as a force display is driven in one embodiment by a controller program executed on a general purpose microcomputer. The controller program defines a virtual reality environment or reflects a tele-environment. An operator using his finger, pen-like tool or other device applies forces to the control point 12 moving the control point 12 within the end effector workspace 16. For forces applied in the xy plane, the planar actuating structure responds to allow movement of the end effector 14. For forces applied in the z direction, the rotational actuating structures respond to allow common movement of the end effector 14 and planar structure 20 along the z-axis.

By using precision direct-drive actuators and serial-link components, substantially frictionless movement of the control point is achieved. During testing friction was less than 1 gr-f, backlash nonexistent, and inertia very low. As a result, a control algorithm is able to effectively define a virtual reality or tele-operational environment with a substantially natural feel. The feel is able to be as good as the controller program allows, rather than be limiting by the mechanics of the manipulator.

Concluding Remarks

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A direct drive actuator system responsive to operator manipulation of a control point, comprising:

an end effector defining a control point accessible to manipulation by an operator within an end effector workspace;

first, second and third kinematic chains coupled in parallel to the end effector in common alignment to the control point to define a redundant actuator structure for allowing motion of the control point within a first plane of the workspace to not more than two degrees of freedom;

the first kinematic chain comprising: a first actuator, a first inner link and a first outer link, the first actuator fixed relative to the first plane and coupled to the first inner link, the first inner link coupled to the first outer link to define a first joint, the first outer link coupled to the end effector in alignment with the control point;

the second kinematic chain comprising: a second actuator, a second inner link and a second outer link, the second actuator fixed relative to the first plane and coupled to the second inner link, the second inner link coupled to the second outer link to define a second joint, the second outer link coupled to the end effector in alignment with the control point; and the third kinematic chain comprising: a third actuator, a third inner link and a third outer link, the third actuator fixed relative to the first plane and coupled to the third inner link, the third inner link coupled to the third outer link to define a third joint, the third outer link coupled to the end effector in alignment with the control point.

2. The actuator system of claim 1 in which positions of the first, second and third actuators in response to operator manipulation at the control point are determined by choosing a torque vector for the respective first, second and third kinematic chains that substantially maximizes the force that can be applied at the control point.

3. The actuator system of claim 1 in which the first kinematic chain further comprises a first optical encoder for sensing position of the first actuator, the second kinematic chain further comprises a second optical encoder for sensing position of the second actuator, and the third kinematic chain further comprises a third optical encoder for sensing position of the third actuator.

4. The actuator system of claim 1 in which the end effector defines a free control point interface allowing an operator to apply a pen-like tool to the control point without the system holding the tool to the control point.

5. The actuator system of claim 1 in which the first, second and third kinematic chains define a common structure, and further comprising a fourth actuator for moving the common structure substantially orthogonal to the first plane within the end effector workspace, wherein the orthogonal movement movement is substantially decoupled from movement within the first plane within the end effector workspace.

6. The actuator system of claim 1 in which the first, second and third kinematic chains each have a respective anchor point and are coupled in parallel at a common joint; and wherein the control point is aligned with the common joint along a line perpendicular to the first plane; and wherein joint angle for the first joint, second joint and third joint are controlled respectively to define the redundant actuator structure which enables motion of the control point within the first plane of motion to not more than two degrees of freedom.

7. The actuator system of claim 1 in which the first, second and third kinematic chains each have a respective anchor point and are coupled in parallel at a common joint; and wherein the control point is aligned with the common joint along a line perpendicular to the first plane; and wherein output torque for each one of the first actuator, second actuator and third actuator are controlled to define the redundant actuator structure which enables motion of the control point within the first plane of motion to not more than two degrees of freedom.

8. A kinematic system responsive to operator manipulation of a control point, comprising:

first, second and third kinematic chains each having a respective anchor point and being coupled in parallel at a common joint;

an end effector in alignment with the common joint along a line perpendicular to a first plane of motion, the end effector defining a control point accessible to manipulation by an operator to move the control point within an end effector workspace;

wherein position of the common joint with respect to each one of the respective anchor points is controlled respectively to define a redundant control structure which allows motion of the control point within the first plane of motion to not more than two degrees of freedom.

9. The system of claim 8, further comprising a tool for being held to the control point only by a force applied by an operator via the tool, the tool being free to make contact and discontinue contact with the control point under operator control.

10. The system of claim 8 in which the position of the common joint with respect to each anchor point is controlled for each of the first, second and third kinematic chain by applying a respective torque vector to the respective first, second and third kinematic chains that substantially maximizes the force that can be applied at the control point.

11. The system of claim 8 in which the position of the common joint with respect to each anchor point is controlled respectively for each of the first, second and third kinematic chain by defining a joint angle for the respective first, second and third kinematic chains that substantially maximizes the force that can be applied at the control point.

12. A direct drive actuator system responsive to operator manipulation of a control point, comprising:

a tool being held by an operator;

an end effector defining a control point accessible to the tool for manipulation via the tool within an end effector workspace, wherein the tool is free to make contact and discontinue contact with the contact point;

first, second and third kinematic chains coupled in parallel to the end effector in common alignment with the control point to define a redundant actuator structure for allowing motion of the control point within a first plane of the workspace to not more than two degrees of freedom;

the first kinematic chain comprising: a first actuator, a first inner link and a first outer link, the first actuator fixed relative to the first plane and coupled to the first inner link, the first inner link coupled to the first outer link to define a first joint, the first outer link coupled to the end effector in alignment with the control point;

the second kinematic chain comprising: a second actuator, a second inner link and a second outer link, the second actuator fixed relative to the first plane and coupled to the second inner link, the second inner link coupled to the second outer link to define a second joint, the second outer link coupled to the end effector in alignment with the control point; and the third kinematic chain comprising: a third actuator, a third inner link and a third outer link, the third actuator fixed relative to the first plane and coupled to the third inner link, the third inner link coupled to the third outer link to define a third joint, the third outer link coupled to the end effector in alignment with the control point.

13. The system of claim 12 in which output torque for each one of the first, second and third actuators is chosen in response to operator manipulation at the control point to define a torque vector for the respective first, second and third kinematic chains that substantially maximizes the force that can be applied at the control point.

14. The system of claim 12 in which joint angle for each one of the first joint, second joint and third joint are controlled respectively to define the redundant actuator structure which enables motion of the control point within the first plane of motion to not more than two degrees of freedom.

* * * * *